United States Patent [19]
Develet, Jr. et al.

[11] Patent Number: 6,064,645
[45] Date of Patent: May 16, 2000

[54] BULK FILTERING AND DEMODULATION OF INDEPENDENT FDMA SOURCES

[75] Inventors: Jean A. Develet, Jr., Rancho Palos Verdes; Oliver W. Saunders, Los Angeles; Eldad Perahia, Hermosa Beach, all of Calif.

[73] Assignee: TRW Inc., Redondo Beach, Calif.

[21] Appl. No.: 08/995,327

[22] Filed: Dec. 22, 1997

[51] Int. Cl.[7] .................................................. H04J 11/00
[52] U.S. Cl. ......................... 370/203; 370/319; 370/343
[58] Field of Search ................................... 370/316, 203, 370/210, 319, 324, 343, 344, 480, 508, 484

[56] References Cited

U.S. PATENT DOCUMENTS

| | | | |
|---|---|---|---|
| 4,719,619 | 1/1988 | Crookshanks | 370/484 |
| 4,879,713 | 11/1989 | Ichiyoshi | 370/316 |
| 4,901,310 | 2/1990 | Ichiyoshi | 370/343 |
| 5,444,697 | 8/1995 | Leung et al. | 370/343 |
| 5,471,464 | 11/1995 | Ikeda | 370/203 |
| 5,506,836 | 4/1996 | Ikeda et al. | 370/203 |
| 5,771,223 | 6/1998 | Kimura et al. | 370/343 |
| 5,787,123 | 7/1998 | Okada et al. | 370/203 |
| 5,867,478 | 2/1999 | Baum et al. | 370/203 |
| 5,909,436 | 6/1999 | Engstrom et al. | 370/343 |
| 5,914,933 | 6/1999 | Cimini et al. | 370/343 |
| 5,923,666 | 7/1999 | Gledhill et al. | 370/480 |
| 5,956,318 | 9/1999 | Saeki | 370/480 |

Primary Examiner—Salvatore Cangialosi
Attorney, Agent, or Firm—Michael S. Yatsko

[57] ABSTRACT

A satellite communications technique is disclosed that synchronizes the reception of numerous OFDM uplink signals (108, 110) at a satellite (106) receiver and bulk processes them in the satellite (106). In operation, the satellite (106) receives an OFDM uplink signal (110) transmitted by a CPE (104). The satellite 106 then compares the reception timing of the symbols in the received OFDM uplink signal (110) with a satellite timing reference, and generates a timing correction. The satellite (106) provides a downlink symbol clock as inherent structure in a downlink beam to the CPE (104) and also transmits the timing correction in the downlink beam. The CPE (104) uses the downlink symbol clock in conjunction with the timing correction to generate an uplink clock. The CPE (104) then transmits data in the OFDM uplink signal (110) synchronously with the uplink clock. Each CPE (102, 104) may be synchronized in this manner. In addition, the satellite (106) may also periodically re-compare the reception timing of the OFDM uplink signals (108, 110) with the satellite timing reference to generate new timing corrections, if necessary, for the CPEs (102, 104).

6 Claims, 3 Drawing Sheets

BULK FILTERING AND DEMODULATION OF INDEPENDENT FDMA SOURCES

BACKGROUND OF THE INVENTION

The present invention relates to satellite communications systems. More specifically, the invention relates to a method of synchronizing received uplink signals at a satellite such that bulk signal processing may be used to simultaneously recover multiple data channels in the uplink signals.

Modern communications networks carry staggering amounts of information, typically divided for transmission purposes into individual data channels. Whether the data channels carried by the communications network have their origin in the telephone system, television stations, or other source, these data channels often need to be transmitted through a communications network including a satellite link.

Where a satellite is a link in the communications network, Customer Premises Equipment (CPE) is used to format the data channels for transmission to the satellite in an uplink signal. Multiple uplink signals may be generated by multiple CPEs, with each uplink signal carrying one or more data channels. Because many CPEs may communicate with a single satellite, the potential number of data channels that a single satellite may need to process can grow very large.

With standard frequency division multiple access (FDMA), the available bandwidth is divided into many narrow frequency subbands (channels) with each CPE transmitting on a unique frequency channel. In addition, the frequency responses of the channels must be kept separated to reduce adjacent channel interference (ACI) which can significantly degrade performance. In conventional satellites, each data channel present in an FDMA uplink signal is received and demodulated on an individual basis.

A very efficient bulk demodulation scheme can be implemented at the satellite to receive and demodulate all the channels in the uplink signal in a single operation. Bulk demodulation requires time signaling synchronization among all the CPEs transmitting uplink signals. In the past, however, satellites and CPEs have been unable to achieve synchronization among the individual CPEs.

Along with time and symbol synchronization, the channels can be spaced such that their frequency responses are orthogonal (thereby giving rise to the name orthogonal frequency division multiplexing (OFDM)). With orthogonal signaling, the frequency responses can be overlapping, and with proper processing, be free of ACI. The result is very efficient bandwidth utilization.

Today, tens of thousands of data channels to be processed by the communications satellite may compete for services in an uplink OFDM signal. A single satellite would require enormous amounts of space, weight, and power to receive, demodulate, and decode the unsynchronized data channels on an individual basis. Increasing the size, weight, and onboard power of a satellite, of course, drives up the cost of the satellite dramatically.

The satellite itself becomes more expensive because of the large quantity of additional processing circuitry required to process data channels on an individual basis. Furthermore, larger, heavier, and more costly solar panels, batteries, or other power sources are required to provide onboard power. In addition, the satellite costs much more to launch because larger rockets using greater quantities of propellant are required to put the larger and heavier satellite into orbit.

Thus, in the past, satellite size, weight, and power restrictions have prohibited satellites from processing the large numbers of data channels that modern communications techniques can generate. A need is present in the industry for improved satellite communications techniques, which overcomes the disadvantages discussed above and previously experienced.

BRIEF SUMMARY OF THE INVENTION

It is an object of the present invention to provide a method of communicating a large number of data channels through a satellite link.

It is a further object of the present invention to enable a satellite to process a large number of data channels without a corresponding increase in the size of the satellite.

It is a further object of the present invention to enable a satellite to process a large number of data channels without a corresponding increase in the power required by the satellite.

It is a further object of the present invention to enable a satellite to process a large number of data channels without a corresponding increase in the weight of the satellite.

It is a further object of the present invention to increase the number of data channels a single satellite may process.

It is a further object of the invention to increase the efficiency of processing multiple OFDM uplink signals with a single satellite.

It is yet another object of the present invention to synchronize independent OFDM uplink signals such that the OFDM uplink signals may be processed in bulk in a satellite.

The satellite communications technique of the present invention synchronizes the reception of numerous CPE-transmitted OFDM uplink signals at the satellite receiver. Because the OFDM uplink signals are synchronized correctly, the satellite may bulk process the data channels in the OFDM uplink signals. In other words, the individual data channels in the OFDM uplink signals may be processed without the need for individual processing electronics for each data channel.

In operation, the satellite receives an OFDM uplink signal transmitted by a CPE. The satellite then compares the reception timing of the received OFDM uplink signal with a satellite timing reference and generates a timing correction. The satellite provides a downlink symbol clock in a downlink beam to the CPE and further transmits the timing correction in the downlink beam.

During reception, the CPE synchronizes to the downlink beam and extracts the inherent downlink symbol clock. The CPE uses the downlink symbol clock in conjunction with the timing correction to generate an uplink clock. The CPE then uses the uplink clock to synchronously pass uplink data to CPE transmitter circuitry.

In the above-described manner, the satellite may synchronize each OFDM uplink signal transmitted by each CPE. The net result is individual OFDM uplink signals arriving at the satellite with synchronization that makes the individual OFDM uplink signals appear to the satellite as a single composite OFDM uplink signal that has a bandwidth spanning the individual OFDM uplink signals. The single composite OFDM uplink signal may then be processed in bulk in the satellite.

External influences, including the gravitational attraction of the sun and the moon, may perturb the orbit of the satellite and thereby affect OFDM uplink signal synchronization. As a result, the satellite may also periodically re-compare the reception timing of the OFDM uplink signals with the satellite timing reference to generate new timing corrections, if necessary, for the CPEs. In this manner, the satellite may keep the OFDM uplink signals in synchronization and achieve the benefits of bulk processing indefinitely.

DETAILED DESCRIPTION OF THE INVENTION

Figure 1:
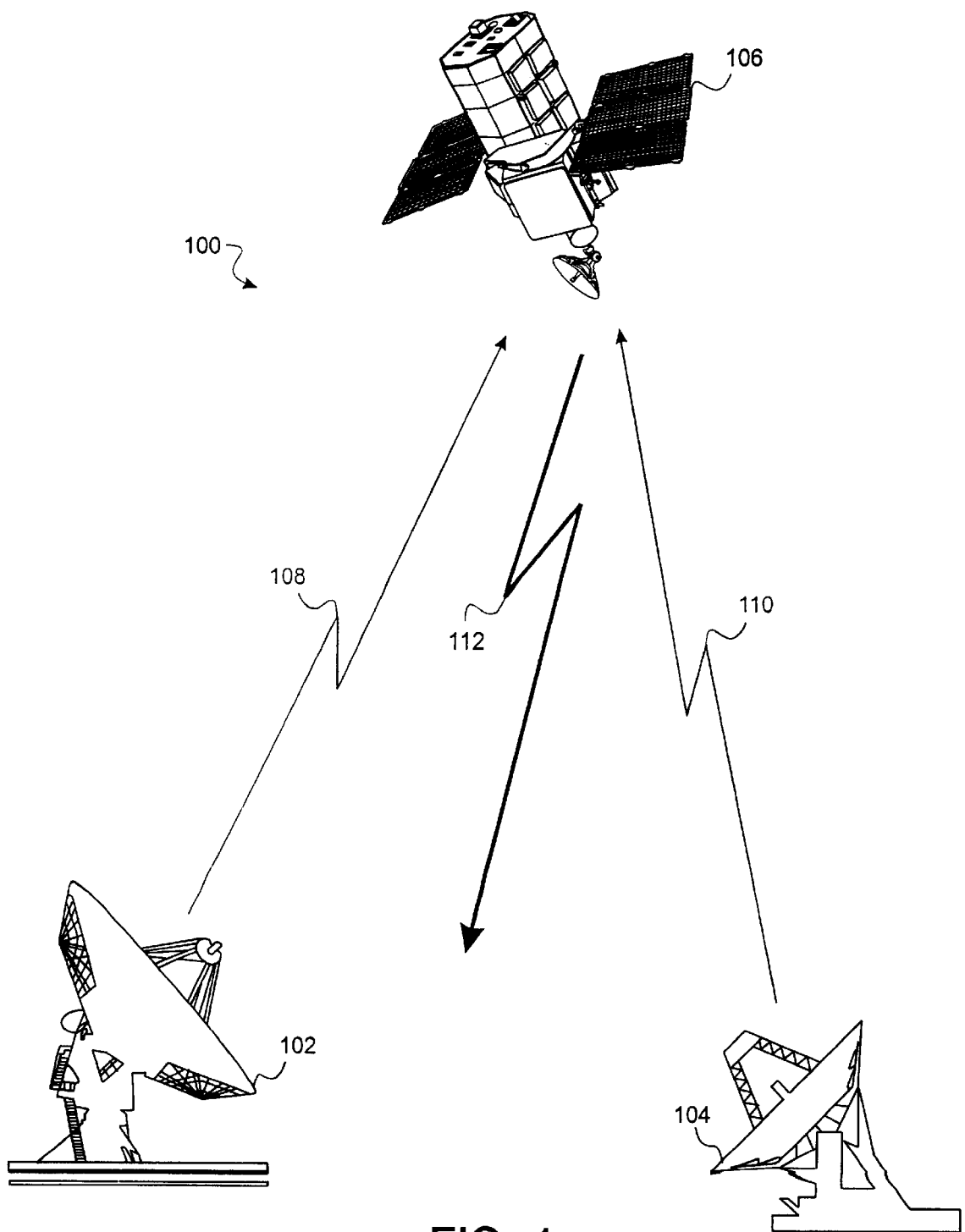
FIG. 1 shows a block diagram of two sets of customer premises equipment (CPEs) and a satellite cooperating in a communications network.

Turning now to FIG. 1, that figure illustrates a communications network 100 including a first CPE 102, a second CPE 104, and a satellite 106. The first CPE 102 transmits a first OFDM uplink signal 108 to the satellite 106, while the second CPE 104 transmits a second OFDM uplink signal 110 to the satellite 106. The satellite 106 communicates in part with the first CPE 102 and second CPE 104 through the downlink beam 112.

As noted earlier, each OFDM uplink signal 108, 110 is divided into a number of subcarriers containing the actual data channels. Furthermore, since there may be additional CPEs (not shown) transmitting OFDM uplink signals to the satellite 106, a large quantity of data channels may arrive for processing at the satellite 106 asynchronously. Because techniques are available for efficiently processing the data channels in an OFDM uplink signal, the present invention uses the satellite 106 to adjust the timing of the individual OFDM uplink signals 108,110 such that the satellite 106 can treat the individual uplink OFDM signals 108,110 as a single composite OFDM uplink signal for processing purposes. In other words, after the satellite adjusts the timing of the individual uplink OFDM signals 108, 110, the satellite may treat the individual uplink OFDM signals 108, 110 as the equivalent of a single composite uplink signal.

Figure 2:
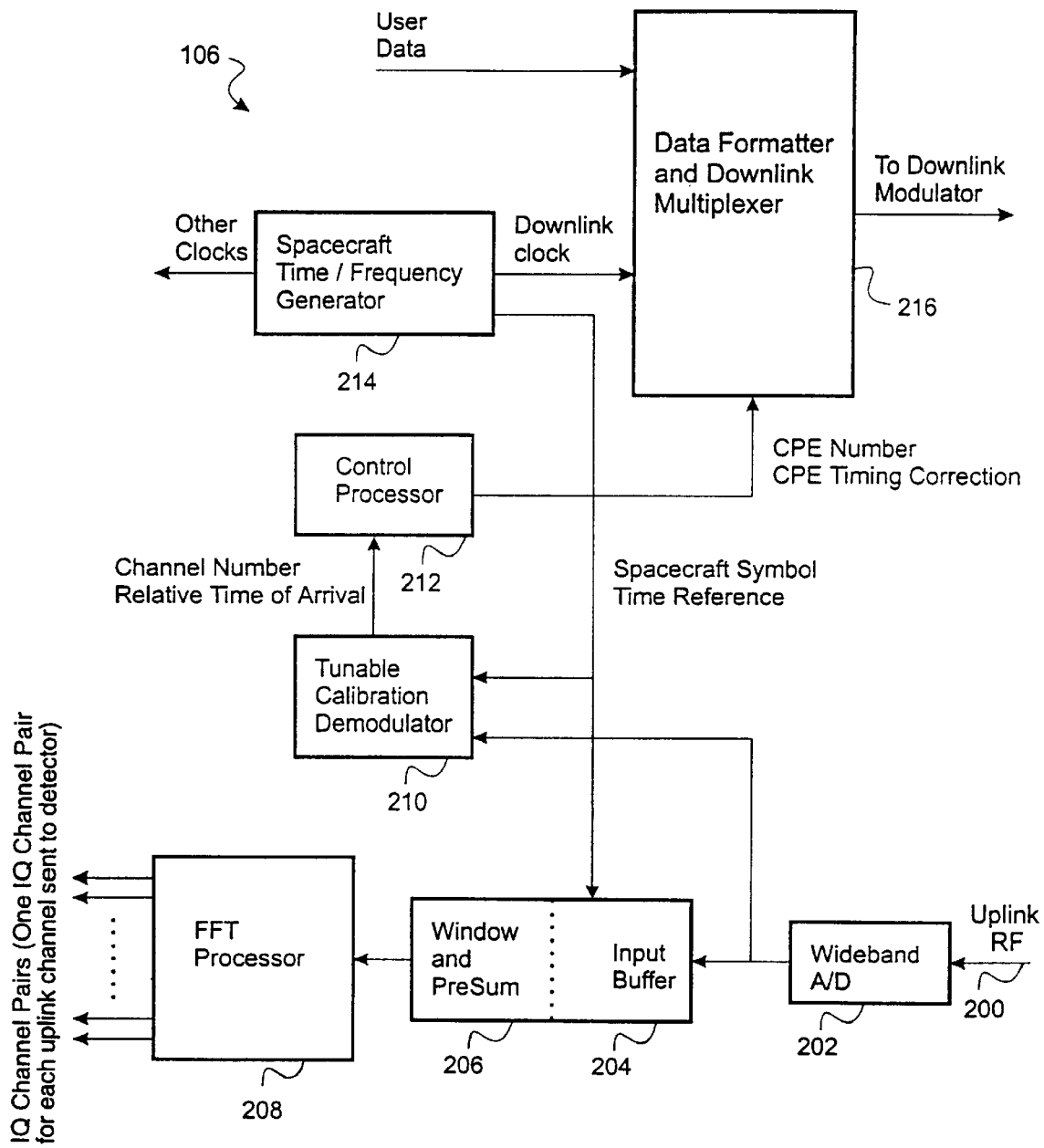
FIG. 2 shows a block diagram of the processing hardware in a satellite that is synchronizing and processing OFDM uplink signals.

In operation, for example, the CPE 104 may begin service by locking onto and demodulating the downlink beam 112 in order to generate an initial uplink clock that controls the timing of the uplink signal 110. As will be explained below, satellite 106 provides the structure in the downlink beam 112 that allows the CPE 104 to lock onto the downlink beam 112. Turning now to FIG. 2, a block diagram of the satellite 106 is shown that illustrates the transmitter, internal synchronization, and processing hardware in the satellite 106.

The satellite 106 receiver provides received signals, including the OFDM uplink signal 110 signal, for processing on an uplink RF receiver output 200 which is connected to a Wideband analog to digital (A/D) converter 202. The satellite 106 also includes an input buffer 204, Window and Pre-sum block 206, and a Fast Fourier Transform (FFT) processor 208.

The satellite 106 further includes a calibration demodulator 210, control processor 212, time and frequency generator 214, and a data formatter and downlink multiplexer 216.

Figure 3:
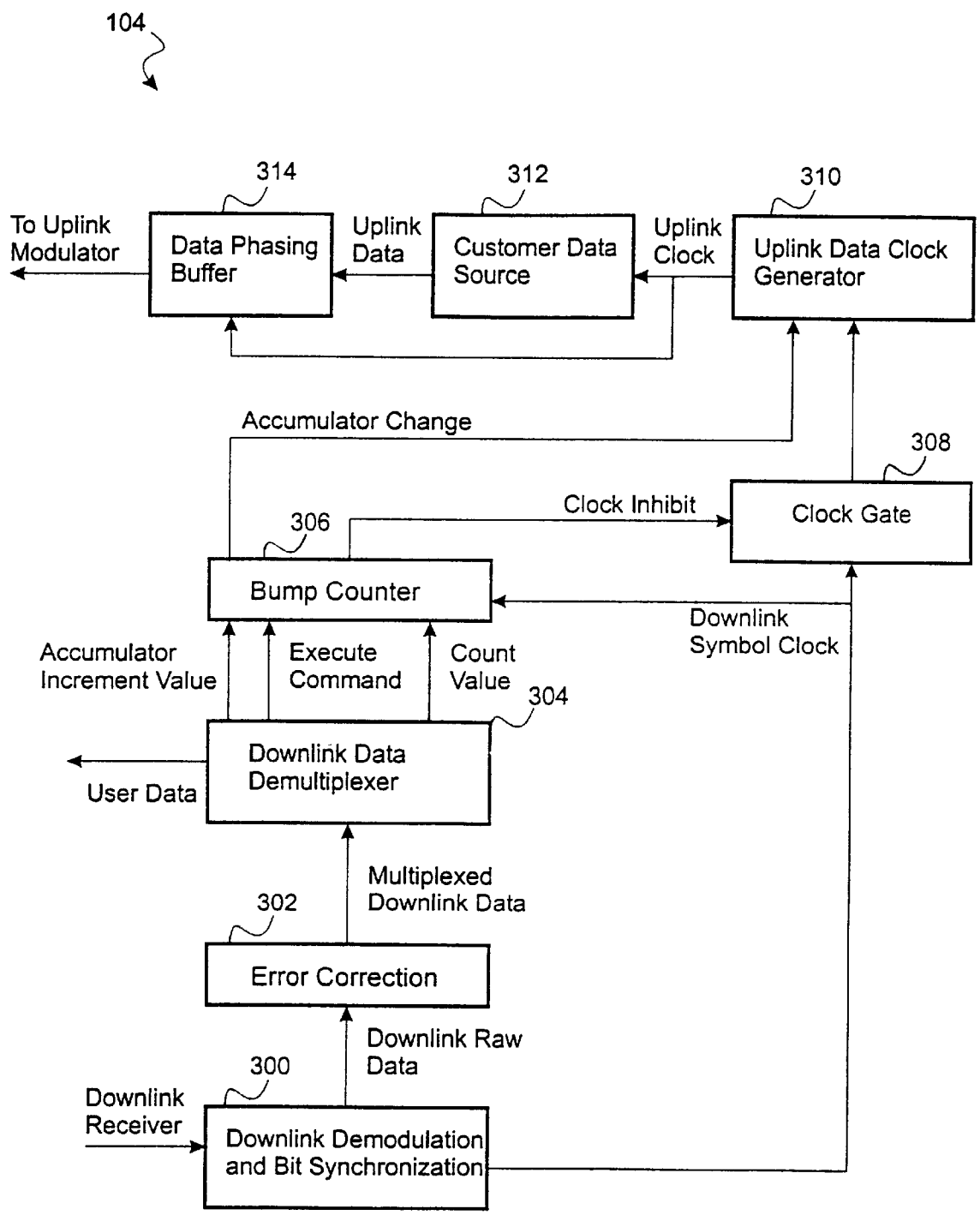
FIG. 3 illustrates a block diagram of the processing hardware in a CPE.

In FIG. 3, a block diagram representative of the CPE 104 is shown. Although FIG. 3 will be discussed with reference to CPE 104, it is noted that the structure shown in FIG. 3 may apply to any CPE in communication with the satellite 106. As shown in FIG. 3, the CPE 104 includes a downlink demodulation and bit synchronizer 300, error correction unit 302, and a downlink data demultiplexer 304. The CPE 104 further includes "Bump" counter 306, clock gate 308, and an uplink clock generator 310. The CPE 104 is able to accept customer data from a customer data source 312 and synchronize the customer data with the data phasing buffer 314. The CPE 104 structure shown in FIG. 3 operates in conjunction with the satellite 106 to establish communication and synchronization with the satellite 106.

Referring again to FIG. 2, during satellite 106 operation the time and frequency generator 214 produces the internal reference clocks used in the satellite 106. In particular, the time and frequency generator 214 generates a downlink clock that is connected to the data formatter and downlink multiplexer 216. The data formatter and downlink multiplexer 216 uses the downlink clock to time the production of data streams that will be transmitted in the downlink beam 112. Thus, the downlink beam 112 contains, as inherent structure, a downlink symbol clock represented by the modulated transmitted data forming the downlink beam 112.

To establish service with the satellite 106, the CPE 104 first locks onto and demodulates the downlink beam 112 using the downlink demodulator and bit synchronizer 300 (FIG. 3). Because the downlink symbol clock is inherent in the downlink beam 112, the downlink demodulator and bit synchronizer 300 may recover the downlink symbol clock and provide it to the clock gate 308. The clock gate 308 determines when the downlink symbol clock is allowed to drive the uplink data clock generator 310. When establishing service with the satellite 106, the clock gate 308 may allow the downlink symbol clock to drive the uplink clock generator 310 continuously so that the CPE can generate an initial uplink clock.

The uplink clock generator 310, in turn, synthesizes an uplink clock from the downlink symbol clock. A variety of techniques may be used to generate the uplink clock, including using a numerically controlled oscillator (NCO) or a digital direct frequency synthesizer (DDFS) that uses the downlink symbol clock as a reference. In a preferred embodiment, the downlink symbol clock provided by the satellite 106 runs at a frequency 10 times or more higher than the uplink clock that the uplink clock generator 310 will synthesize. An initial frequency for the uplink clock may be established, for example, by storing a predetermined increment value in the NCO accumulator.

Once the CPE 104 has generated its initial uplink clock, it may then request service through the satellite 106 by transmitting a synchronization request to the satellite 106. The CPE 104, for example, may use the OFDM uplink signal 110 to send the synchronization request to the satellite 106. In a preferred embodiment, the CPE 104 transmits the synchronization request at a rate which is a submultiple of the uplink clock rate that the CPE 104 uses. The synchronization request preferably includes a CPE 104 identifier, such as a unique number, string, or location. The satellite 106, in turn, processes the synchronization request and provides the CPE 104 with synchronization information.

Information in the OFDM uplink signal 110, including synchronization requests, may be processed starting at the uplink RF receiver output 200. The uplink RF receiver output 200 connects to the Wideband A/D converter 202 which converts the OFDM uplink signal present on the uplink RF receiver output 200 into digital samples. The calibration demodulator 210 analyzes the digital samples and detects the presence of the synchronization request. Note that the time and frequency generator 214 provides a spacecraft symbol time reference to the calibration demodulator 212. The calibration demodulator 212 may, therefore, determine the relative time of arrival between the OFDM uplink signal 110 carrying the synchronization request and the spacecraft symbol time reference.

In a preferred embodiment, the calibration demodulator 210 operates at ten to twelve times the digital sample rate in order to provide timing measurement accuracy in the symbols that make up the uplink data channel of under 1% of the symbol duration and uplink signal 110 frequency measurement inaccuracy of under 5% of the symbol rate. The calibration demodulator 210 forwards the relative time of arrival to the control processor 212.

The control processor 212 determines the timing correction needed to place the uplink signal 110 at the optimum time position for bulk processing of the OFDM uplink signal 110. The control processor 212 determines the timing correction for the CPE 104 such that the symbols in the data channels in the OFDM uplink signal 110 arrive at the satellite in synchronization with other OFDM uplink signals. As a result, the individual OFDM uplink signals appear to the satellite 106 as a single composite OFDM uplink signal that has a bandwidth spanning the individual OFDM uplink signals. As a result of the synchronization process, the OFDM uplink signal timing is phased so that each symbol interval in each data channel in each OFDM uplink signal spans each FFT processor 208 input data block.

After the control processor 212 has determined the necessary timing correction for the uplink signal 110, the control processor 212 forwards the timing correction along with the corresponding CPE 104 identifier to the data formatter and downlink multiplexer 216. The data formatter and downlink multiplexer 216 inserts the timing correction and CPE 104 identifier into the downlink data stream along with any additional user data destined for the CPE 104. The satellite 106 then transmits the resultant multiplexed raw data comprising the downlink data stream in the downlink beam 112 for processing in the CPE 104.

Referring again to FIG. 3, in the CPE 104, the downlink demodulator and bit synchronizer 300 extracts the raw data destined for the CPE 104 from the downlink beam 112. The raw data undergoes error correction controlled by the error correction unit 302 in conjunction with any predetermined error correcting codes (for example, parity codes, Hamming codes, block codes, or convolutional codes) that the satellite may have used. The output of the error correction unit 302 consists of downlink data which is multiplexed between user data and timing correction information. The downlink data demultiplexer 304 separates the user data from the timing correction and forwards the timing correction to the bump counter 306.

In one embodiment of the present invention, the timing correction represents the number of downlink symbol clock periods for which the downlink symbol clock should be disabled. In response, the bump counter 306 produces a clock inhibit signal which causes the clock gate 308 to disconnect the downlink symbol clock from the uplink data clock generator 310 (thereby delaying, phase shifting, and correcting the uplink clock generated by the uplink data clock generator 310). The bump counter 306 releases the clock inhibit signal when the bump counter 306 has detected that the number of downlink symbol clock periods indicated by the timing correction has passed. Note that the bump counter 306 may operate whenever the timing correction is non-zero, or, in an alternative embodiment, the satellite 106 may provide an explicit execute command in addition to the timing correction to start the operation of the bump counter 306.

In another embodiment of the present invention, the satellite 106 provides a new accumulator increment value for an NCO operating as the uplink data clock generator 310. The bump counter 306 may then assert the new accumulator increment value to the uplink data clock generator 310. According to NCO operating principles, if the accumulator increment value is increased, the resultant NCO output frequency is increased, while the NCO output frequency is decreased if the accumulator increment value is decreased. The new accumulator increment value may be set as permanent change in the uplink data clock generator 310. Alternatively, the satellite 106 may also provide a count value representing the number of downlink symbol clocks after which the bump counter 306 de-asserts the new accumulator increment value (thereby allowing the uplink data clock generator 310 to revert to its previous accumulator increment value). It is noted that the timing correction schemes discussed above may be used with one another, or with any other timing correction method (such as controlling the voltage on a voltage controlled oscillator).

Once the CPE 104 is in synchronization, it may begin regular OFDM uplink signal transmissions to the satellite 106. Note that the CPE 104 may provide the uplink clock to the customer data source 312 to help ensure synchronization. Because the user data source may contain delays that the CPE 104 cannot account for, however, the customer data source 312 may be connected to a data phasing buffer 314.

The data phasing buffer 314 is connected to the CPE 104 transmitter, the uplink clock, and the customer data source 312. Customer data produced by the customer data source 312 may thereby be buffered in the data phasing buffer 314. The data phasing buffer 314 then stores the customer data and provides the customer data to the CPE transmitter with the uplink clock to maintain the proper synchronization.

Because the CPE 104 is synchronized with other individual OFDM uplink signals, the satellite 106 may treat all the OFDM uplink signals arriving at the satellite as a single composite OFDM uplink signal. In other words, the satellite 106 may bulk process the composite OFDM uplink signal.

To accomplish bulk processing, the satellite 106 employs the Wideband A/D converter 202 to generate signal samples representative of the composite OFDM uplink signal arriving at the satellite 106. The signal samples are then operated on in bulk by an FFT process. The FFT process optionally includes the pre-processing steps of synchronously buffering the digital samples with the spacecraft symbol time reference in the input buffer 204, as well as windowing and presuming the digital samples for more efficient processing by the FFT processor 208.

The FFT processor 208 produces signals representative of the data channels carried in the composite uplink signal. Because the symbols in the data channels making up the OFDM uplink signals are synchronized with the FFT processor 208 input data block, the FFT processor 208 also functions as a predetection matched filter at the uplink symbol rate. In one embodiment of the present invention, the FFT processor 208 is configured to generate channel I-Q pairs that represent the Quadrature Phase Shift Keying (QPSK) modulation of the data channels. If differential detection is used, each channel may be demodulated by performing a complex multiplication between the current I-Q pairs and the complex conjugate of the previous I-Q pairs. The FFT processor 208 outputs data for each channel at the uplink symbol rate. Furthermore, the FFT processor 208 may continue to operate indefinitely because the satellite 106 periodically checks the synchronization of each OFEM uplink signal.

External influences, including the gravitational forces of the Earth and Moon, may perturb the orbit of the satellite and thereby affect the OFDM uplink signal 110 synchronization. As a result, the satellite 106 may periodically re-compare the reception timing of the OFDM uplink signal 104 with the spacecraft symbol timing reference to generate new timing corrections for the CPE 104. The satellite 106 may re-compare the reception timing on a fixed basis, for example every 10 or 20 minutes, or on command, for example, from a ground station. In this manner, the satellite 106 may keep the OFDM uplink signal 110 in synchronization and achieve the benefits of bulk processing indefinitely.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for bulk processing a plurality of OFDM uplink signals in a satellite, the method comprising the steps of:
   a. providing a method for synchronizing an OFDM uplink signal at a satellite, said method for synchronizing comprising the following steps:
      a1. receiving at said satellite an OFDM uplink signal transmitted by a CPE;
      a2. comparing reception timing of said OFDM uplink signal with a satellite timing reference and generating a timing correction;
      a3. providing a downlink symbol clock in a downlink beam received by said CPE;
      a4. providing said timing correction in said downlink beam received by said CPE;
   b. producing an equivalent single composite OFDM uplink signal at said satellite by synchronizing at said satellite according to step (a) a plurality of OFDM uplink signals;
   c. applying bulk processing at said satellite on said single composite OFDM uplink signal.

2. The method of claim 1, further comprising the steps of:
   d. periodically re-comparing said reception timing of said OFDM uplink signals with said satellite timing reference to generate a new timing correction.
   e. providing said new timing correction in said downlink beam to said CPE.

3. The method of claim 1, wherein said bulk processing step comprises the substeps of:
   c1. converting said composite OFDM uplink signal to digital samples; and
   c2. FFT processing said digital samples.

4. The method of claim 3, wherein said FFT processing step simultaneously produces an I-Q channel pair for each uplink channel.

5. The method of claim 3, wherein said FFT processing step further comprises the steps of providing an input buffer storing said digital samples and performing an FFT windowing and pre-summing operation on said digital samples.

6. The method of claim 3, further comprising the steps of:
   d. periodically recomparing said reception timing of said OFDM uplink signal with said satellite timing reference to generate a new timing correction.
   e. providing said new timing correction in said downlink beam to said CPE.

* * * * *